C. A. Kirkpatrick.
Paddle Wheel.

No. 48,956. Patented Jul. 25, 1865.

Witnesses:
Theo Tusch
Wm. Trewn

Inventor:
C. A. Kirkpatrick
By Munn & Co
Attys

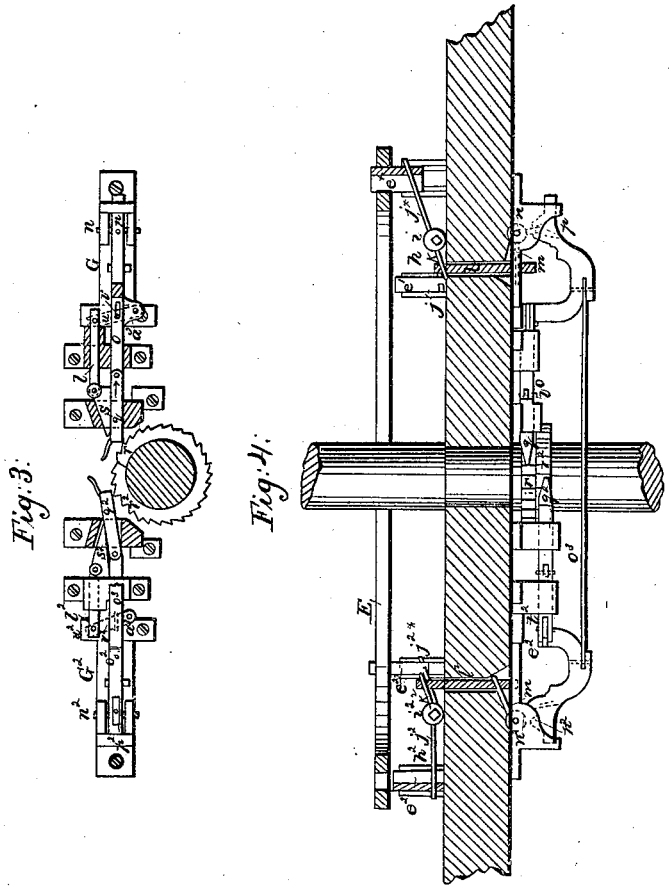

UNITED STATES PATENT OFFICE.

C. A. KIRKPATRICK, OF SOMERVILLE, MASSACHUSETTS.

IMPROVED PADDLE-WHEEL.

Specification forming part of Letters Patent No. 48,956, dated July 25, 1865.

*To all whom it may concern:*

Be it known that I, C. A. KIRKPATRICK, of Somerville, in the county of Middlesex and State of Massachusetts, have invented a new and Improved Paddle-Wheel; and I do hereby declare that the following is a full, clear, and exact description thereof, which will enable others skilled in the art to make and use the same, reference being had to the accompanying drawings, forming part of this specification, in which—

Figure 2:
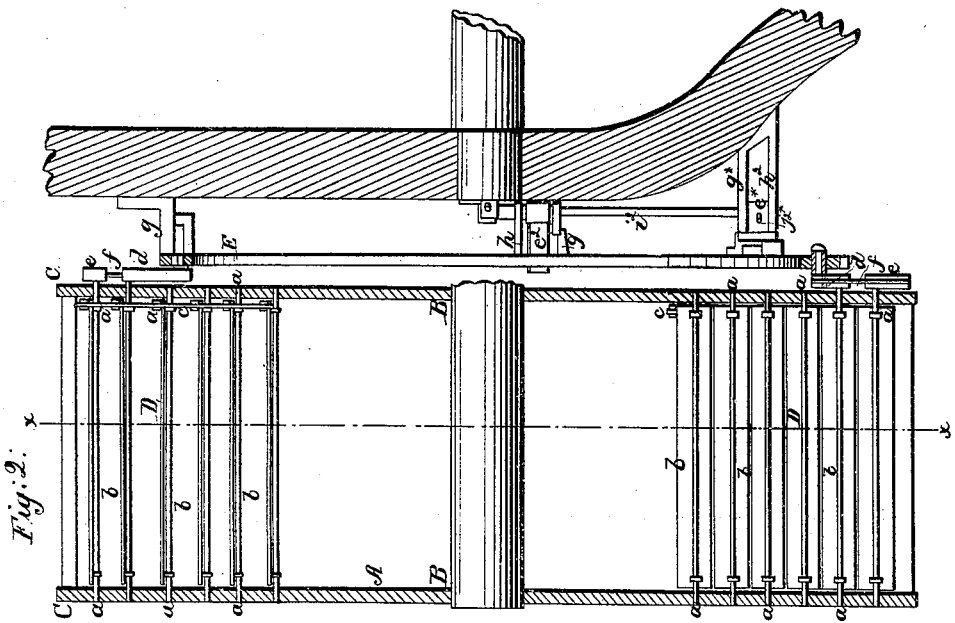
Figure 1:
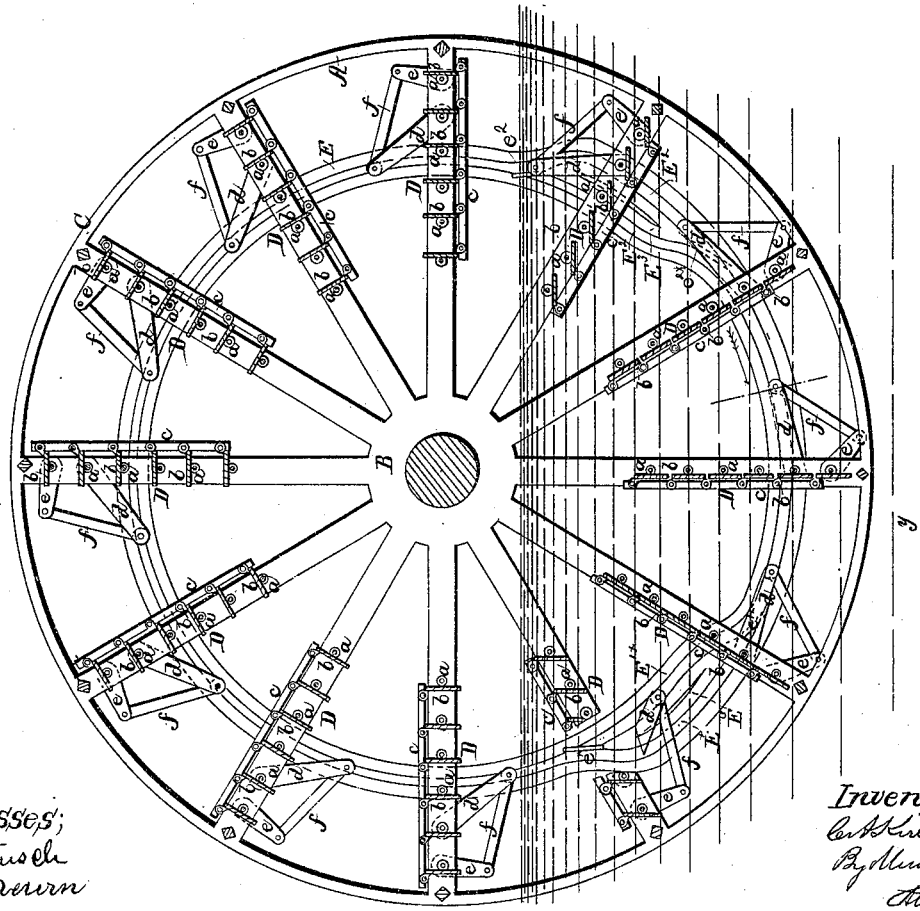

Figure 1 represents a vertical section of this invention transversely to the shaft, the line $x$ $x$, Fig. 2, indicating the plane of section. Fig. 2 is a vertical section of the same, taken in a plane parallel to the shaft, as indicated by the line $y$ $y$, Fig. 1. Fig. 3 is an inside elevation of the reversing-gear. Fig. 4 is a horizontal section of the same.

Similar letters of reference indicate like parts.

This invention consists, first, in making the buckets of a paddle-wheel each of a series of movable shutters or slats, similar to an ordinary window-blind, in such a manner that said slats can be turned edgewise as they descend in and rise out of the water, and to close up, while passing through the water, in a position to offer a very extended working-surface to the water, in combination with a cam-slot and with a suitable crank, in such a manner that by the action of each crank on said cam-slot all the slats composing one of the paddles are opened or closed simultaneously, and such opening and closing is attended with the least possible loss by friction; second, the use of adjustable gates, in combination with a double cam-slot and with the cranks and slats composing the paddles, in such a manner that by changing the position of said gates the crank-pins are automatically thrown from the inner to the outer section of the cam-slot, or vice versa, and the wheel is made reversible in a simple way; third, in the use of an automatic reversing-gear, composed of a double ratchet, with corresponding pawls, gates, and double cam-slot, or other equivalent means, in such a manner that on reversing the motion of the wheel the gates are shifted automatically and the slats of the paddles are opened and closed at the proper points in whatever direction the wheel may be turned.

A represents a paddle-wheel composed of a series of arms, which radiate from hubs B, and the outer ends of which are connected by rims C. The radiating arms form the bearings for the tenons $a$ of the slats $b$, which compose the paddles or buckets D, said buckets being constructed similar to ordinary blinds, as clearly shown in Figs. 1 and 2 of the drawings. Each slat is provided with ears, which form the bearings for the pivots connecting the slat-bars $c$ to the slats, so that by turning one slat of a set or bucket all the slats composing said set or bucket will be turned correspondingly. Two of the tenons in each bucket extend through the arm which forms their bearings on the inside next to the vessel, and on these ends are mounted cranks $d$ $e$, one of which is much longer than the other, the longest being secured loosely to their tenons, whereas the shortest are firmly keyed thereto. The outer ends of the long cranks $d$ connect with the outer ends of the short cranks $e$ by links $f$, and said long cranks are provided with wrist-pins that extend into a cam-slot, E. By the combination of cranks of different length the motion requisite to open and shut the slats is obtained, for by turning the wrist-pins of the long cranks through a comparatively short arc the short cranks are turned over an arc of ninety degrees, or sufficient to open and close the slats, as above stated.

The cam-slot E is secured to the outside of the vessel by means of brackets $g$ $g^*$, and it is so shaped that by its action on the wrist-pins of the cranks $d$ the slats are closed as soon as they have entered the water and again opened on leaving the water.

In order to render the wheel capable to be reversed the cam-slot must be constructed with branches $E^*$ $E'^*$ $E^2$ $E^{2*}$, as clearly shown in Fig. 1 of the drawings. If the wheel rotates in the direction of the arrow marked near it in Fig. 1, the wrist-pins of the cranks $d$ travel through the branch $E^{2*}$ on one, and through the branch $E'^*$ on the opposite, side of the cam-slot, and the slats close up after they have descended in the water, and they open on ascending. If the motion of the wheel is reversed, the wrist-pins of the cranks $d$ must be made to pass through the branches $E^*$ and $E^2$. This change is effected by movable gates $e^*$ $e'^*$ $e^2$ $e^{2*}$, which are situated opposite the partitions $E^3$, between the branches E* E'* E² E²*. These partitions terminate at both ends in sharp points, and the gates move in and out in suitable slides, $h$ $h^2$, in such a position that when they are pushed out they close the communication between the main portion of the cam-slot and its outer or inner branches E* E'* E², E²*. For instance, the gates $e^*$ $e^2$ close the communication between the main channel of the cam-slot and its inner branches, E'* E², and the gates $e'^*$ $e^{2*}$ close the communication between said main channel and the outer branches, E* E²*. When the wheel revolves in the direction of the arrow marked near it in Fig. 1, the gates $e^2$ and $e'^*$ are pushed forward and the gates $e^{2*}$ $e^*$ are drawn in. As the wrist-pins of the cranks $d$ arrive in successive order at the gate $e^2$ they are thrown from the main channel of the cam-slot into the branch E²* and the slats close, and as said wrist pins pass onto the gate $e'^*$ they are thrown from the main channel of the cam-slot into the inner branch, E'*, and the slats of the buckets open. When the wheel turns in the opposite direction the gates $e^*$ and $e^{2*}$ are closed or pushed out and the gates $e'^*$ $e^2$ are opened or drawn in, and the time when the slats close and open is changed accordingly.

The gates $e^*$ $e'^*$ are operated by means of a vertical rock-shaft, $i$, situated on one side of the wheel, and the gates $e^2$ $e^{2*}$ by a corresponding rock-shaft, $i^2$, situated on the opposite side of said wheel. These rock-shafts have their bearings in suitable ears extending from the brackets $g$ $g^*$, and the gates $e^*$ $e'^*$ $e^2$ $e^{2*}$ are situated on opposite sides of their respective shafts, and arms $j^*$ $j'^*$ $j^2$ $j^{2*}$ extending from said rock-shafts pass into suitable holes in said gates, so that by turning the rock-shafts in one direction the gates $e^*$ $e^{2*}$ are pushed out and the gates $e'^*$ $e^2$ drawn in and by turning the shafts in the opposite direction the gates $e'^*$ $e^2$ are pushed out and the gates $e^*$ $e^{2*}$ drawn in.

The mechanism for operating the gates and for turning the shafts is best shown in Figs. 3 and 4. From the rock-shafts $i$ $i^2$ extend arms $k$ $k^2$ into suitable sockets in the outer ends of slides $l$ $l^2$, which move in and out in mortises in the side of the vessel, as shown in Fig. 4. These slides are provided with an additional set of sockets near their inner ends to receive arms $m$ $m^2$, which extend from short vertical arbors $n$ $n^2$. These arbors have their bearings in suitable brackets, G G², secured to the inner surface of the vessel's side, and they receive a vibrating motion by means of slides $o$ $o^2$, connecting with said shafts by arms $p$ $p^2$ extending from the inner sides thereof, as shown. The slides are connected to each other by a rod, $o^3$, and they are operated by the action of ratchet-wheels $r$ $r^2$ on pawls $q$ $q^2$, which are hinged to the inner ends of the slides, and which engage with the teeth of said ratchet-wheels by their own inherent gravity. The teeth of the ratchet-wheels are beveled in opposite directions, and said wheels are firmly keyed to the shaft of the paddle-wheel A. If this shaft rotates in the direction of the arrow marked on it in Fig. 3, the teeth of the ratchet-wheel $r$ strike the pawl $q$, and by pushing the slide $o$ back in the direction of the arrow marked thereon in said figure, both shafts $i$ and $i^2$ (the slides $o$ $o^2$ being connected as previously stated) are turned in such a direction that the gates $e^*$ $e^{2*}$ are pushed out and the gates $e'^*$ $e^2$ drawn in. At the same time a wedge, $s$, is pushed out over the pawl $q$, so as to hold the same down and prevent the gates $e^*$ $e'^*$ $e^2$ $e^{2*}$ from changing their position spontaneously, and a similar wedge, $s^2$, over the pawl $q^2$ is drawn back, allowing said pawl to rise to the position shown in Fig. 3.

The wedges $s$ $s^2$ are pivoted to slides $t$ $t^2$, to which a reciprocating motion is imparted by levers $u$ $u^2$, which turn on pivots $v$ $v^2$ passing through slots in the slides $o$ $o^2$, and are connected by pivots $a^3$ to ears projecting from the lower edges of the slides $o$ $o^2$ in such a manner that the slides $t$ $t^2$ move in an opposite direction to the slides $o$ $o^2$. If the motion of the paddle-wheel is reversed the teeth of the ratchet-wheel $r^2$ catch against the pawl $q^2$, the slides $o$ $o^2$ move in the direction opposite the arrow marked thereon in Fig. 3, and the gates $e^*$ $e'^*$ $e^2$ $e^{2*}$ are reversed automatically.

The buckets are protected by diamond-shaped cross-bars inserted between the two rims, close to the periphery of the wheel. If desired, the slat can be rendered rigid by removing the crank $d$ and securing the crank $e$ to its arm.

I claim as new and desire to secure by Letters Patent—

1. The combination of the movable slats with the cam-slot, when arranged and operating substantially as and for the purpose specified.

2. The adjustable gates applied in combination with the cam-slot and movable slats, in the manner and for the purpose described.

3. The combination of the double ratchet, double cam, and movable gates, all constructed, arranged, and operating as herein described, to constitute an automatic reversing-gear.

C. A. KIRKPATRICK.

Witnesses:
M. M. LIVINGSTON,
C. L. TOPLIFF.